United States Patent
Olakangil

(10) Patent No.: US 8,559,331 B2
(45) Date of Patent: Oct. 15, 2013

(54) TRI-COLOUR DATA PACKET COUNTING FOR TRI-COLOUR MARKING POLICIES

(75) Inventor: Joseph F. Olakangil, Midvale, UT (US)

(73) Assignee: Alcatel Lucent, Paris (FR)

( * ) Notice: Subject to any disclaimer, the term of this patent is extended or adjusted under 35 U.S.C. 154(b) by 362 days.

(21) Appl. No.: 12/880,373

(22) Filed: Sep. 13, 2010

(65) Prior Publication Data

US 2012/0063352 A1    Mar. 15, 2012

(51) Int. Cl.
*G01R 31/08* (2006.01)
*H04J 1/16* (2006.01)

(52) U.S. Cl.
USPC ......... 370/253; 370/252; 370/230; 370/392; 370/400; 709/200; 709/224

(58) Field of Classification Search
USPC ........ 370/253, 252, 230, 392, 474, 400, 428; 709/200, 224
See application file for complete search history.

(56) References Cited

U.S. PATENT DOCUMENTS

| | | | |
|---|---|---|---|
| 8,300,525 B1 * | 10/2012 | Kohn et al. | 370/230 |
| 2005/0135399 A1 * | 6/2005 | Baden et al. | 370/428 |
| 2009/0248875 A1 * | 10/2009 | Kamijima et al. | 709/226 |
| 2010/0061260 A1 * | 3/2010 | Bugenhagen | 370/252 |

OTHER PUBLICATIONS

Aboul-Magd at al., A Differentiated Service Two-Rate, Three-Color Marker with Efficient Handling of in-Profile Traffic, Nortel Networks, (The Internet Society) Jul. 2005.
J. Heinanen et al., A Single Rate Three Color Marker, University of Pennsylvania, (The Internet Society), Sep. 1999.
J. Heinanen et al., A Two Rate Three Color Marker, University of Pennsylvania (The Internet Society) Sep. 1999.

* cited by examiner

*Primary Examiner* — Andrew Chriss
*Assistant Examiner* — Jamal Javaid
(74) *Attorney, Agent, or Firm* — Kramer & Amado P.C.

(57) ABSTRACT

The invention is directed to counting data packets marked according to tri-color marking techniques. Packets of a packet flow that are marked according to a three color (or tri-color) marking scheme are counted using a counter implemented on a ternary content addressable memory (TCAM). Advantages of some embodiments of the invention are to enable the use of generic and cost-efficient TCAMs to quickly obtain the counts of all three colors of packets in such a packet flow. These counts can be used to provide detailed statistics on characteristics of the packet flow, which can be useful for debugging and accounting purposes.

11 Claims, 3 Drawing Sheets

TRI-COLOUR DATA PACKET COUNTING FOR TRI-COLOUR MARKING POLICIES

FIELD OF THE INVENTION

The invention is directed to data packet communications, particularly to managing flows of data packets in a communications network.

BACKGROUND OF THE INVENTION

Various techniques for metering a packet flow and marking its packets based on traffic parameters are known. For example, a single rate three color marker (srTCM) uses a committed information rate (CIR) and two associated burst sizes, a committed burst size (CBS) and an excess burst size (EBS), as traffic parameters. According to that technique, a packet is marked as green if it does not exceed the CBS, as yellow if it exceeds the CBS but not the EBS, or otherwise it is marked as red. The color of the packet is coded in a field of the packet's header.

SUMMARY

Embodiments of the invention are directed to counting data packets marked according to tri-color marking techniques.

According to some embodiments of the invention, packets of a packet flow that are marked according to a three color (or tri-color) marking scheme are counted using a counter implemented on a ternary content addressable memory (TCAM).

According to an aspect of the invention, a method of counting packets of a data packet flow marked according to a tri-color marking scheme is provided. The method includes the steps of: receiving a packet of the flow; determining an identifier for the flow; determining a marked color of the received packet; incrementing a first counter at a TCAM entry corresponding to the identifier responsive to the marked color being a first color of said tri-color marking scheme; incrementing a second counter at a TCAM entry corresponding to the identifier responsive to the marked color being a second color of said tri-color marking scheme; and incrementing a third counter at a TCAM entry corresponding to the identifier.

In some embodiment of the invention the method further includes determining a count of packets from the flow having a marked color being a third color of said tri-color marking scheme by subtracting from a current count of the third counter a sum of current counts of the first and second counters.

In some embodiments of the invention the first and second counters are implemented on a first TCAM and the third counter is implemented on a second TCAM. In some embodiments of the invention the first, second and third counters are implemented on respective TCAMs; whereas in some other embodiments those counters are implemented on a single TCAM.

According to another aspect of the invention a method of configuring a tri-color packet counter for counting packets of a data packet flow marked according to a tri-color marking scheme is provided. The method includes the steps of: determining an identifier for the flow; ascertaining if there is a TCAM entry for the identifier; ascertaining, responsive to there being said TCAM entry, if there are three TCAM counters associated with the entry; and configuring, responsive to there being fewer than three such TCAM counters, one or more TCAM counters associated with the entry so there are a total of at least three TCAM counters associated with the entry.

In some embodiments of the invention the method comprises configuring comprises configuring the one or more counters such that two of the at least three counters are configured on a first TCAM and a third of the at least three counters is configured on a second TCAM.

According to yet another aspect of the invention, a tri-color counter for counting data packets of a packet flow that have been marked using a tri-color marking technique is provided. The tri-color counter includes: a first TCAM configured with an entry corresponding to an identifier of the flow and having first and second counters associated with the entry for respectively counting packets of first and second marked colors of the tri-color marking technique; a second TCAM configured with an entry corresponding to the identifier and having a third counter associated with the entry for counting all packets of the flow; and a TCAM controller for receiving packets of the flow, incrementing the first counter responsive to a received packet being of the first marked color or incrementing the second counter responsive the received packet being of the second marked color, and incrementing the third counter for each received packet of the flow.

Advantageously, some embodiments of the invention provide statistics on packets of a packet flow, which can be used for debugging, billing or other accounting purposes.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

When managing packet flows using a tri-color marking scheme a user may find it desirable to count red, yellow and green packets. However, for both cost reasons and speed reasons, a single TCAM entry usually updates at most two counters. Solutions using generic TCAMs to implement srTCM are thus able to count packets of only two of the three colors; thereby requiring a choice to be made as to which color packets will be counted. Unfortunately, such solutions would not meet the desire to count packets of all three colors, for example as could be useful to fully account for flow characteristics for debugging or accounting purposes.

Figure 1:
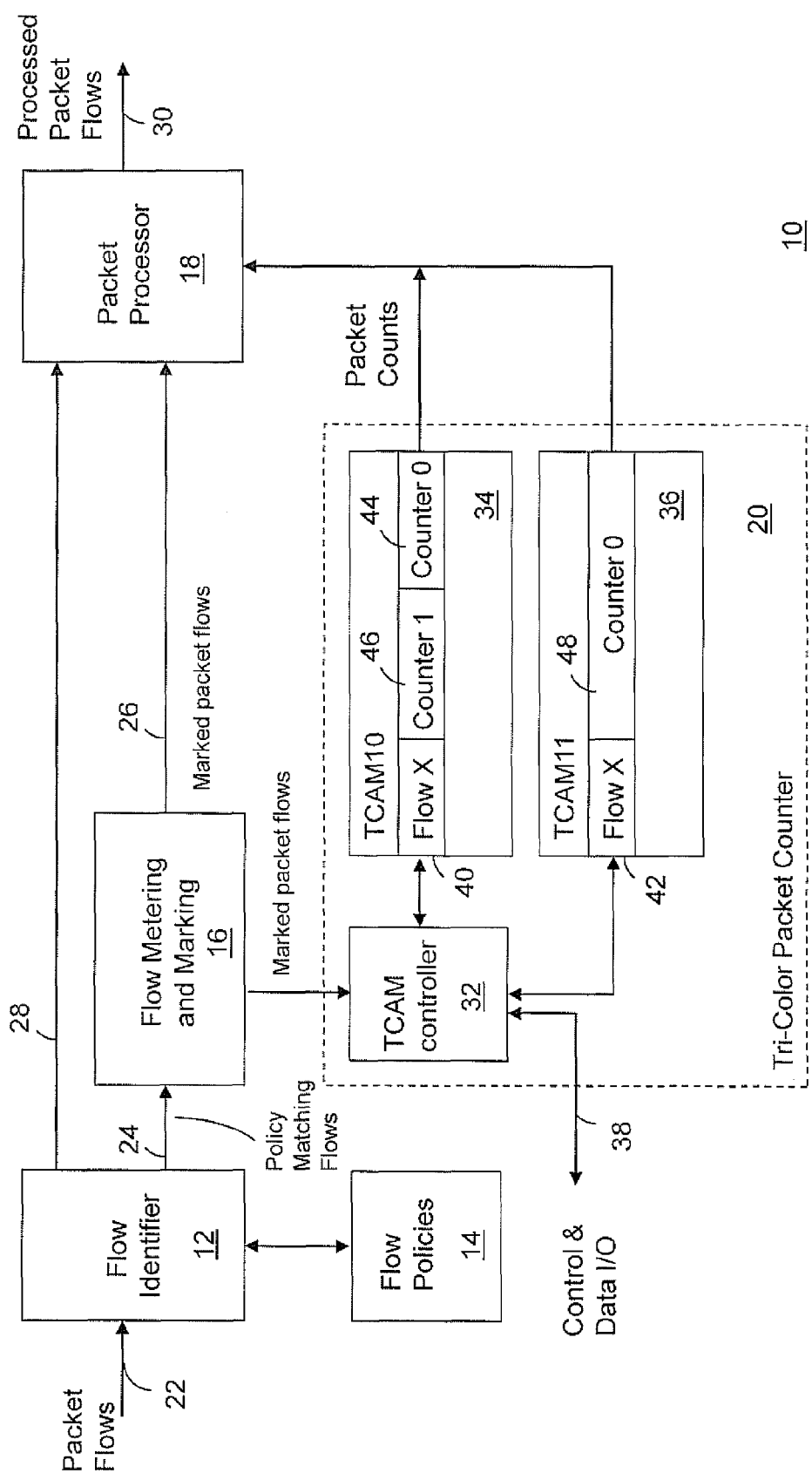
FIG. 1 illustrates an apparatus for counting packets according to a first embodiment of the invention.

FIG. 1 illustrates an ingress packet classifier 10 according to a first embodiment of the invention. The classifier 10 includes a flow identifier 12, a store of flow policies 14, a marking and metering device 16, a packet processor 18, and a tri-color packet counter 20. The flow identifier 12 receives packet flows 22, and determines which received flows match one or more flow policies 14. Such policy matching flows 24 are metered and marked according to a tri-color marking scheme, such as srTCM described briefly above, to result in marked packet flows 26, which are forwarded to the packet processor 18 and the tri-color packet counter 20. Other flows 28 not matching flow policies are forwarded directly to the packet processor 18. The packet processor 18 receives the marked packet flows 26 and the other flows 28 and performs packet processing operations to result in processed packet flows 30, which are forwarded from the packet processor 18 to other subsystems of a data packet switch. The packet processor 18 may receive counts of packet flows from the tri-color packet counter 20 and use these counts in processing packets of those flows.

The tri-color packet counter 20 includes a TCAM controller 32, a first TCAM 34 (TCAM10) and a second TCAM 36 (TCAM11). The TCAM controller 32 includes an input/output (I/O) interface 38 for control and data information, such as could be used or provided by the TCAM controller 32. For example, via the I/O interface 38 the TCAM controller 32 may receive information from a control subsystem of the data packet switch to configure the first and second TCAMs 34, 36 with information identifying a flow of which colored packets are to be counted by the TCAMs 34, 36. Additionally, for example, via the I/O interface 38 the TCAM controller 32 may provide packet counts read from the TCAMs 34, 36 to a statistics processing subsystem of the data packet switch to facilitate flow debugging or flow accounting purposes.

The first and second TCAMs 34, 36 each have a respective entry for each packet flow that has been configured on them. For example, the first TCAM 34 has a first entry 40 configured on it for a first flow, identified as "flow X"; and the second TCAM 36 has a second entry 42 configured on it for the first flow as well. Typically, each TCAM entry can reference two counters enabling it to count two of the possible three colors. The first entry 40 has two such counters; a first counter 44 (counter 0) and a second counter 46 (counter 1). The second entry 42 has only one such counter, a third counter 48 (counter 0). The first and second entries 40, 42 are effectively paired together by having the same flow identifier, i.e. flow X, configured on them. This enables the third counter 48 to count in parallel to the prior two counters 44, 46, wherein the third counter 48 counts all the packets matching the flow identifier (e.g. flow X). The count of packets of the third color is then obtained by subtracting from the count of the third counter 48 the sum of the counts of the first and second counters 44, 46.

Figure 2:
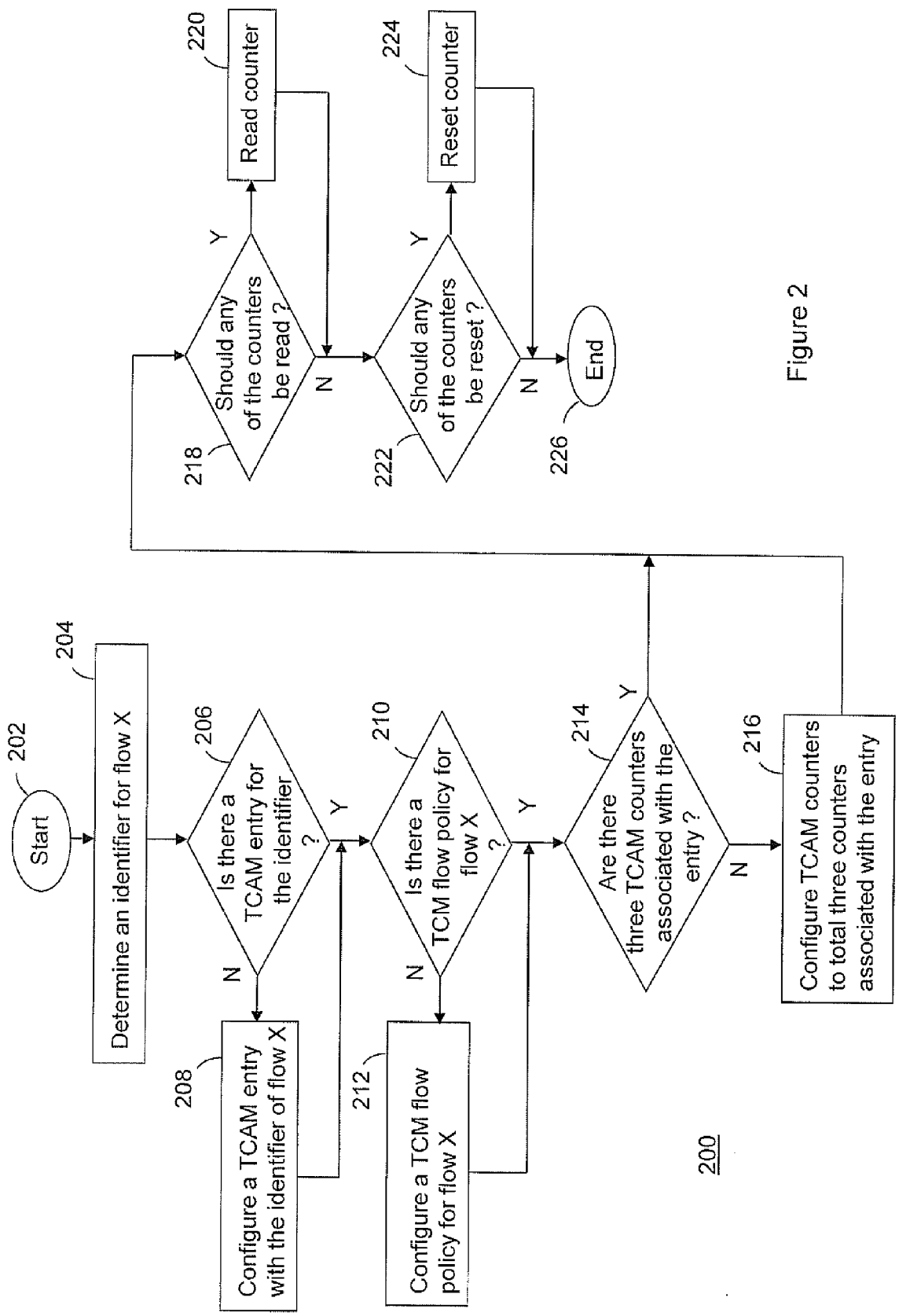
FIG. 2 illustrates a method of configuring a tri-color packet counter for counting packets in accordance with a second embodiment of the invention.

FIG. 2 illustrates a method 200 of configuring a tri-color packet counter for counting packets in accordance with a second embodiment of the invention. This method 200 could be performed by the apparatus depicted in FIG. 1, for example.

Referring to FIGS. 1 and 2, after starting 202 the method 200 proceeds to determining 204 an identifier for a given flow, herein referred to as flow X. For example, this determination 204 could be performed by the flow identifier 12 using a 5-tuple for the flow consisting of source and destination IP and Media Access Control (MAC) addresses and a port number of packets in the flow. Next, the method 200 proceeds to determining 206 if there is a TCAM entry for the identifier corresponding to the flow. For example, this determination 206 could be made by the TCAM controller 32 in response to input received from the I/O interface 38 or from the flow metering and marking function 16. To do so, the TCAM controller 32 could simply query the first and second TCAMs 34, 36 using the identifier. If there is no TCAM entry associated with the flow then the method 200 proceeds to configuring 208 a TCAM entry with the identifier of flow X, which may include using a bit-mask on or associated with the identifier in some cases. For example, the TCAM controller 32 may configure the first and second entries 40, 41 on the first and second TCAMs 34, 36.

After the step of configuring 208 a TCAM entry, or in the affirmative case of determining 206 if there is a TCAM entry for the flow, the method 200 proceeds to determining 210 if there is a Tri-color marking (TCM) flow policy for flow X. For example the flow identifier 12 could perform this step. If there is no TCM flow policy for flow X, the method 200 proceeds to configuring 212 a TCM flow policy for flow X, otherwise the method 200 proceeds to determining 214 if there are three counters associated with the TCAM entry for flow X. For example the flow identifier 12 could perform the configuration 212 and the TCAM controller 32 could perform the determination 214 regarding the counters.

If it is determined 214 that there are not three counters associated with the TCAM entry for flow X then the method 200 proceeds to configuring 216 TCAM counters to total three counters associated with the entry for flow X. Otherwise, if there are already three such counters, the method 200 proceeds to determining 218 if any of the counters should be read. In the affirmative case, the counters are read 220 and the method 200 proceeds to determining 222 if any of the counters should be reset. Otherwise, if none of the counters are to be read then the method 200 proceeds directly to the step of determining 222 if any of the counters are to be reset. In the affirmative case, the method 200 proceeds to resetting 224 the counters and ends 226; otherwise the method 200 simply ends 226. The steps of reading 220 and resetting 224 the counters could be performed by the TCAM controller 32.

Figure 3:
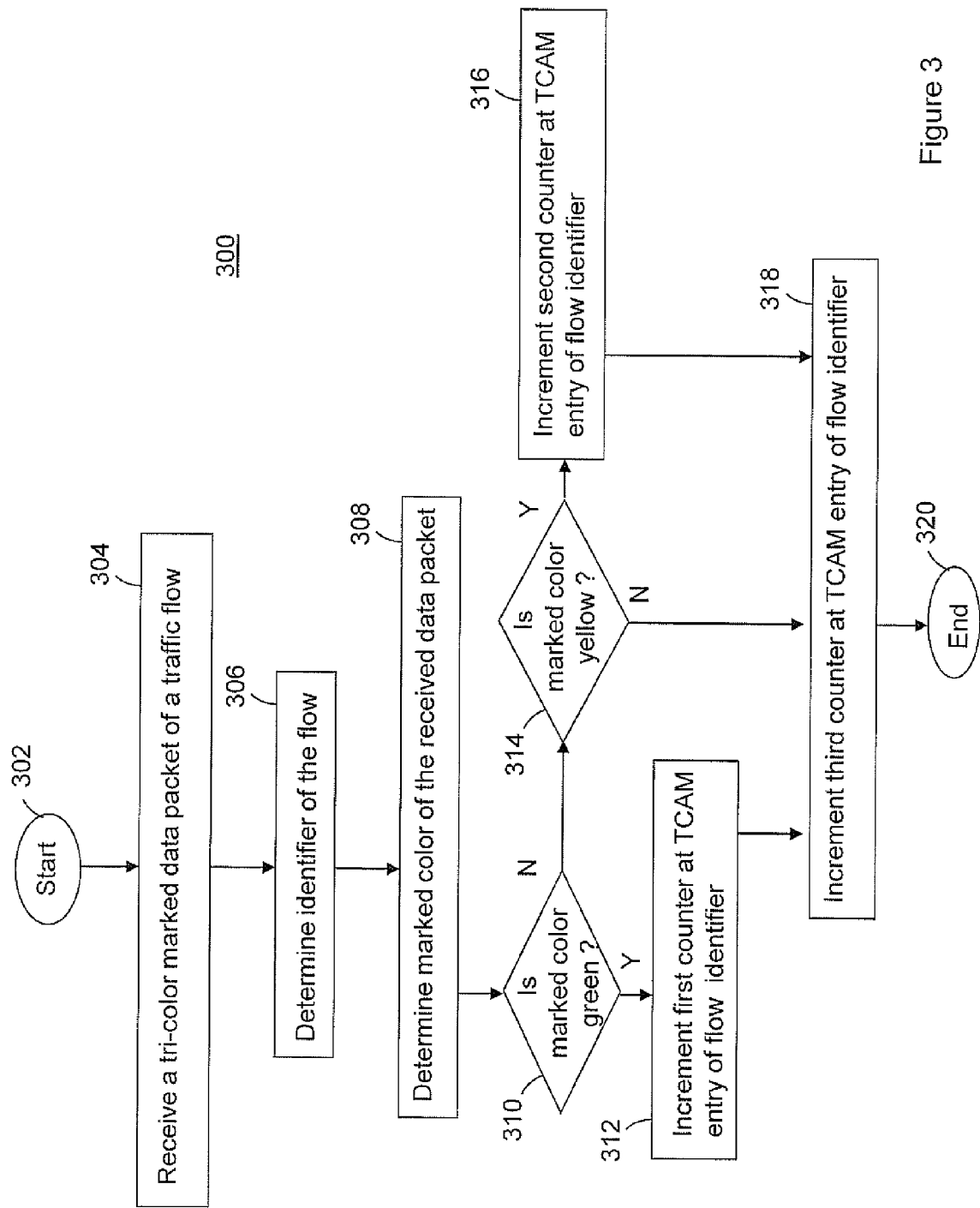
FIG. 3 illustrates a method of counting tri-color packets in accordance with a third another embodiment of the invention.

FIG. 3 illustrates a method 300 of counting tri-color packets in accordance with a third another embodiment of the invention. This method 300 could be performed by the apparatus depicted in FIG. 1, for example.

Referring to FIGS. 1 and 3, after starting 302 the method 300 proceeds to receiving 304 a tri-color marked data packet of a traffic flow and then to determining 306 an identifier of the flow. For example, the flow identifier 12 could receive such a packet and perform the determination 306. The method 300 then proceeds to determining 308 a marked color of the received data packet. For example, this determination 308 could be done by the TCAM controller 32, e.g. by checking one or more bits in the packet header that encode the packet's marked color. The method 300 then proceeds to determine 310 if the marked color is green, which in the affirmative case a first counter at a TCAM entry corresponding to the identifier of the flow is incremented 312. Subsequent to incrementing the first counter, the method 300 proceeds to incrementing 318 a third counter at a TCAM entry corresponding to the identifier of the flow and then the method 300 ends or returns to its start 302 to await reception 304 of another tri-color marked packet. For example, determining 310 if the marked color of the packet is green could be performed by the TCAM controller 32 and incrementing the first and third counters could be performed by the TCAM controller 32 in conjunction with the first and third counters 44, 48 of the first and second TCAMs 34, 36.

In the case that the marked color of the received packet is determined not to be green, the method proceeds to determining 314 if the marked color of the packet is yellow. If the marked color is yellow, the method 300 proceeds to incrementing 316 a second counter at a TCAM entry corresponding to the identifier of the flow and then proceeds to incrementing 318 the third counter at a TCAM entry corresponding to the identifier of the flow. Otherwise, if the marked color is not yellow, the method 300 proceeds directly to incrementing 318 the third counter. Subsequent to incrementing 318 the third counter the 300 ends or returns to its start 302 to await reception 304 of another tri-color marked packet. For example, determining 310 if the marked color of the packet is yellow could be performed by the TCAM controller 32 and incrementing the second and third counters could be performed by the TCAM controller 32 in conjunction with the second and third counters 46, 48 of the first and second TCAMs 34, 36.

At any point during execution of the method 300 the first, second and third counters contain the respective current counts of green, yellow, and total packets of the flow that have been received since those counters were last reset. Obtaining the current counts of green, yellow, and red marked packets of the flow can be had by reading the first and second counters in the case of green and yellow marked packets, respectively, and by subtracting the sum of those counters from that of the third counter in the case of red marked packets. For example, the steps of reading and resetting the counters could be performed as described in the method 200 of configuring a tri-color packet counter.

Modifications, variations and adaptations may be made to the embodiments of the invention described above. For example, a fourth embodiment may be implemented on a Broadcom™ BCM56630 chipset, or other similar chipsets.

The BCM56630 chipset has an ingress classification engine (IFP) that consists of 16 TCAMs operating in parallel. Each TCAM has 512 entries and 1024 counters; thereby allowing for 512 counter pairs in this fourth embodiment. Each entry can update any two or any one counter within those 1024 counters. For example, in this embodiment we use TCAM 10 and TCAM 11.

The tri-color marking policy is configured in TCAM10 entry 0. This entry will meter a packet flow based on user configured rates for the flow, CIR and peak information rate (PIR), and their respective burst sizes, CBS and peak burst size (PBS), to mark packets of the flow red, green or yellow based on its profile status. Two meters are setup for implementing this metering. Counter Pair 0 is allotted to this entry. COUNTER_MODE in the FP_POLICY_TABLE is set to mode 6 which will increment counter 0 on yellow packets and counter 1 on green packets.

To count red packets we now allocate TCAM entry 0 from TCAM11. This entry can be a similar to entry 0 of TCAM 10 or optionally to conserve resources this entry can be paired with TCAM entry 0 from TCAM 10, by pairing the two TCAMs (pairing the TCAM is done by setting the SLICE 10_11_PAIRING=1 in the FP_PORT_FIELD_SEL table). Counter 0, belonging to counter pair 0 from TCAM 11 is allotted to this entry. The counter mode is set to 1, which updates the lower counter in the counter pair 0.

TCAM11 entry 0 is not configured to do any policing on the flow, and as such its counter will count all the packets that match the entry. When a packet matching the policy ingresses the switch, the packet is policed by TCAM10 entry, and marked appropriately as red, green or yellow based on the meter status. The counters TCAM10 Counter 0 is incremented if the packet is yellow. TCAM10 Counter 1 is incremented if the packet is green. TCAM11 Counter 0 is incremented, every time a matching packet ingresses the classification engine.

After each packet of a matching packet flow is processed, the count of green packets is GreenCount=TCAM10 Counter 1, the count of yellow packets is YellowCount=TCAM10 Counter 0, and the count of all packets in the flow is AllCount=TCAM11 Counter 0. The count of red color packets in that flow is obtained as REDCount=AllCount−GreenCount−YellowCount.

Yet another variation, for example in a fifth embodiment, would be to use an egress TCAM (EFP) to count the green and yellow packets, since typically red packets will be dropped and then not reach the egress TCAM. The IFP TCAM could then count only the red and green packets (or only the red and yellow packets), and one could arrive at the yellow (or green) count. However, this is slightly more complex, and the count might not be as accurate, because some packets might not reach the egress TCAM for a variety of other switching reasons, even if those packets are not red.

Advantages of some embodiments of the invention are to enable the use of generic and cost-efficient TCAMs to quickly obtain the counts of all three colors of packets in a packet flow that are marked using a tri-color marking policy. These counts can be used to provide detailed statistics on characteristics of a packet flow, which can be useful for debugging and accounting purposes.

Numerous modifications, variations and adaptations may be made to the embodiments of the invention described above without departing from the scope of the invention, which is defined in the claims.

What is claimed is:

1. A method of counting packets of a data packet flow marked according to a tri-color marking scheme, comprising the steps of:
   receiving a packet of the flow;
   determining whether the flow matches a srTCM flow policy;
   determining an identifier for the flow;
   determining a marked color of the received packet;
   incrementing a first counter at a first ternary content-addressable memory (TCAM) entry corresponding to the identifier responsive to the marked color being a first color of said tri-color marking scheme;
   incrementing a second counter at the first TCAM entry corresponding to the identifier responsive to the marked color being a second color of said tri-color marking scheme; and
   incrementing a third counter at a second TCAM entry corresponding to the identifier.

2. The method of claim 1, further comprising determining a count of packets from the flow having a marked color being a third color of said tri-color marking scheme by subtracting from a current count of the third counter a sum of current counts of the first and second counters.

3. The method of claim 1, wherein the first and second colors are green and yellow and the third color is red.

4. The method of claim 1, wherein the first and second counters are implemented on a first TCAM and the third counter is implemented on a second TCAM.

5. The method of claim 1, wherein the first, second, and third counters are implemented on respective first, second and third TCAMs.

6. The method of claim 1, wherein the first, second, and third counters are implemented on a single TCAM.

7. The method of claim 1, wherein the step of incrementing a third counter comprises incrementing the third counter regardless of the marked color.

8. The method of claim 1, further comprising
   ascertaining if there is a TCAM entry for the identifier;
   ascertaining, responsive to there being said TCAM entry, if there are three TCAM counters associated with the entry; and
   configuring, responsive to there being fewer than three such TCAM counters, one or more TCAM counters associated with the entry so there are a total of at least three TCAM counters associated with the entry.

9. The method of claim 8, wherein configuring comprises configuring the one or more counters such that two of the at least three counters are configured on a first TCAM and a third of the at least three counters is configured on a second TCAM.

10. The method of claim 9 wherein configuring said policy in the flow policy storage comprises configuring said policy on either the first or second TCAM.

11. The method of claim 1, further comprising:
  responsive to the flow not matching a srTCM flow policy, configuring said policy in a flow policy storage.

\* \* \* \* \*